(12) United States Patent
Guo et al.

(10) Patent No.: US 12,595,103 B2
(45) Date of Patent: Apr. 7, 2026

(54) BLISTER PACKAGE PREVENTING COLORANT TRANSFER

(71) Applicant: Energizer Brands, LLC, St. Louis, MO (US)

(72) Inventors: Jingdong Guo, Westlake, OH (US); Joseph Michael Srebernak, Rocky River, OH (US)

(73) Assignee: Energizer Brands, LLC, St. Louis, MO (US)

( * ) Notice: Subject to any disclaimer, the term of this patent is extended or adjusted under 35 U.S.C. 154(b) by 0 days.

(21) Appl. No.: 18/808,589

(22) Filed: Aug. 19, 2024

(65) Prior Publication Data

US 2026/0048917 A1 Feb. 19, 2026

(51) Int. Cl.
*B65D 75/36* (2006.01)
*H01M 50/124* (2021.01)
*H01M 50/153* (2021.01)

(52) U.S. Cl.
CPC ........ *B65D 75/36* (2013.01); *H01M 50/1245* (2021.01); *H01M 50/153* (2021.01); *B65D 2585/88* (2013.01)

(58) Field of Classification Search
CPC . B65D 75/36; B65D 2585/88; H01M 50/153; H01M 50/1245
USPC ........................................ 206/703, 704, 471
See application file for complete search history.

(56) References Cited

U.S. PATENT DOCUMENTS 5,187,033 A 2/1993 Koshiba
5,540,324 A * 7/1996 Knapp .................. B65D 75/22 206/348
6,039,185 A * 3/2000 Pedracine ........... H01M 50/216 206/704
6,083,644 A 7/2000 Watanabe et al.
(Continued)

FOREIGN PATENT DOCUMENTS

CN 118020200 A 5/2024
JP 2015-111500 A 6/2015
WO 2013/106821 A1 7/2013

OTHER PUBLICATIONS

Coin Cell Batteries With Aversive-Agent Coating filed Mar. 1, 2024, U.S. Appl. No. 18/593,391.
(Continued)

*Primary Examiner* — Jacob K Ackun
(74) *Attorney, Agent, or Firm* — Alston & Bird LLP

(57) ABSTRACT

A blister package for an electrochemical cell having a water-soluble coating on at least one terminal. The package comprises a first plastic panel and a second plastic panel. The second plastic panel is secured to the first plastic panel such that a cavity is defined having a closed planar side opposite the open side and parallel with at least one of the first planar portion or the second planar portion. The cavity may include a substantially cylindrical sidewall that extends between the closed planar side and one of the first planar portion or the second planar portion surrounding the cavity. The cavity includes a standoff post having a distal end extending into the cavity and spaced away from the sidewall to define an unoccupied volume surrounding the standoff post and spaced apart from the other of the first plastic panel or the second plastic panel to define a battery-placement cavity.

20 Claims, 7 Drawing Sheets
(1 of 7 Drawing Sheet(s) Filed in Color)

(56) References Cited

U.S. PATENT DOCUMENTS 6,364,115 B1 * 4/2002 Casanova .............. B65D 75/36 206/471
6,659,281 B2 * 12/2003 Gaffney ............. B65D 83/0454 206/704
9,793,519 B2 10/2017 Dipietro et al.
9,865,862 B2 1/2018 Ok
10,103,361 B2 10/2018 Takahashi et al.
10,700,362 B2 6/2020 Boolish et al.
10,868,284 B2 12/2020 Laulicht et al.
11,088,387 B2 8/2021 Kim et al.
11,127,943 B2 9/2021 Xie
11,355,822 B2 6/2022 Hawa et al.
11,967,681 B2 4/2024 Suzuki
12,221,552 B2 2/2025 Knight et al.
12,315,942 B2 5/2025 Laulicht et al.
2002/0153278 A1 * 10/2002 Pirro .................. B65D 73/0092 206/703
2002/0192546 A1 12/2002 Mao et al.
2005/0103680 A1 * 5/2005 Nakatsu ................ H01M 12/06 206/704
2006/0278551 A1 * 12/2006 Bianchini .............. B65D 81/30 206/463
2007/0072082 A1 3/2007 Scott et al.
2007/0241019 A1 * 10/2007 Crouchley ............. B65D 75/24 206/278
2008/0308445 A1 * 12/2008 Dolak ..................... B65B 11/50 53/467
2012/0080353 A1 * 4/2012 Brenner ............... B65D 75/367 206/704
2013/0104796 A1 5/2013 Bhat et al.
2013/0161231 A1 * 6/2013 Haering .................... B65B 5/02 206/704
2015/0214514 A1 7/2015 Imanishi et al.
2016/0226039 A1 8/2016 Kuo et al.
2016/0355325 A1 12/2016 Kuo et al.
2018/0159092 A1 6/2018 Barenberg et al.
2018/0159093 A1 6/2018 Barenberg et al.
2020/0067126 A1 2/2020 Han et al.
2021/0203024 A1 7/2021 Yura et al.
2021/0234144 A1 7/2021 Hawa et al.
2021/0344017 A1 11/2021 Hong et al.
2022/0311109 A1 9/2022 Laulicht et al.
2023/0007966 A1 1/2023 Felber et al.
2024/0162505 A1 5/2024 Marsh et al.
2024/0356118 A1 10/2024 Sano et al.
2025/0112303 A1 4/2025 Guo et al.
2025/0197666 A1 6/2025 Knotts et al.
2025/0206961 A1 6/2025 Guo

OTHER PUBLICATIONS

Coin Cell Batteries With Thin Aversive-Agent Coating filed Mar. 1, 2024, U.S. Appl. No. 18/593,533.

Lithium Coin Cell Batteries With Polymer And Aversive-Agent Coating Located Exterior to the Cell to Avoid Impacting Conductivity filed Mar. 1, 2024, U.S. Appl. No. 18/593,527.

Materials and Methods for Improving Aversive-Agent Coating Adhesion to Battery Casing filed Mar. 1, 2024, U.S. Appl. No. 18/593,561.

ISA/220—Notification of Transmittal or Search Report and Written Opinion of the ISA, or the Declaration Mailed on Nov. 4, 2025 for WO Application No. PCT/US25/036383, 42 page(s).

* cited by examiner

BLISTER PACKAGE PREVENTING COLORANT TRANSFER

FIELD

The present disclosure relates generally to packages for coin or button type electrochemical cells.

BACKGROUND

Coin cell batteries (also referred to herein as coin cells or button cells), such as those described in International Patent Publication No. PCT/US2013/021430, filed Jan. 14, 2013, the contents of which are incorporated herein by reference in their entirety, are small, disc-shaped batteries commonly used in a wide range of electronic devices, such as hearing aids, cochlear implant processors, calculators, remote controls, and wristwatches. These cells and batteries are often referred to as button cells due to their shape and size.

Accidental ingestion of coin cells by children can lead to serious injury and even death, in part due to an electrical current from the battery generating hydroxide (high pH) on the negative side through an electrolysis reaction that occurs when the battery is in contact with bodily fluids, such as tissue fluids, mucus, esophageal lining fluids, stomach fluids, or the like. The hydroxide formed causes alkaline burns and perforations of the esophagus. Serious injuries can occur in as little as two hours.

To address this issue, many manufacturers have implemented anti-swallow features. For example, an anti-swallow feature is a raised border around the circumference of the battery. The raised border makes it difficult for a child to swallow the battery. Other anti-swallow features encompass a bitter-tasting coating on the surface of the battery that deters children from putting the battery in their mouths. However, if swallowed, a coin cell or button cell coated with a bitterant or having a raised circumferential border will still cause an electrolysis reaction in the esophagus or stomach and cause severe injury. Therefore, inclusion of a signal to parents or other care-givers that a battery may have been ingested may be helpful. Such signal can be achieved by use of a colorant to stain the mouth, hands, or other areas wetted by body fluids like saliva that have been in contact with a lithium coin cell.

Coatings may wear off on the packaging when being transported, and therefore adding a coating to the exterior of the battery is sometimes not effective. Accordingly, a need exits for improved packaging designs for electrochemical cells having a coating over a portion of the exterior of the electrochemical cell.

SUMMARY

Described herein is a blister package configured to enclose batteries having a water-soluble aversive coating. The blister pack comprises a plurality of features with desirable cavities and protrusions that provide a safe and inexpensive way to transport the battery having a water-soluble aversive coating while protecting the water-soluble aversive coating from wear on the blister package. For example, various features may extend across planar surfaces, curved surfaces, and/or complex curved surfaces in order to provide wear resistance of the water-soluble coating on the packaging.

Various embodiments are directed to a blister package comprising: a first plastic panel having a first planar portion; a second plastic panel having a second planar portion, wherein the second plastic panel is secured to the first plastic panel such that the first planar portion is in a first plane parallel and adjacent to the second planar portion in a second plane; wherein at least one of the first plastic panel or the second plastic panel defines a cavity having an open side that is surrounded by the first planar portion or the second planar portion and is closed between the first plastic panel and the second plastic panel; wherein the cavity defines: a closed planar side opposite the open side and parallel with at least one of the first planar portion or the second planar portion; and an at least substantially cylindrical sidewall extending between the closed planar side and one of the first planar portion or the second planar portion surrounding the cavity.

In certain embodiments, at least one of the first plastic panel or the second plastic panel defines a standoff post having a distal end extending into the cavity and spaced away from the sidewall to define an unoccupied volume surrounding the standoff post and spaced apart from the other of the first plastic panel or the second plastic panel to define a battery-placement cavity.

In some embodiments, the first plastic panel defines a truncated-cone shaped cavity having an open side that is surrounded by the first planar portion and covered by the second planar portion of the second plastic panel. The truncated-cone shaped cavity is defined by a closed planar side opposite the open side and parallel with the first planar portion. The closed planar side has a diameter less than a diameter of the open side and a sidewall extending between the closed planar side and the first planar portion. The sidewall and the base of the truncated-cone shaped that is coplanar with the first planar defines an interior angle between 45°-85°.

In certain embodiments, the packaging material may comprise of polyvinyl chloride (PVC), polyethylene terephthalate (PET), or other thermoplastic polymers. The packaging system may comprise various strengthening feature that extend across planar surfaces, curved surfaces, and/or complex surfaces to provide crush resistance tensile strength, and/or the like for the container.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
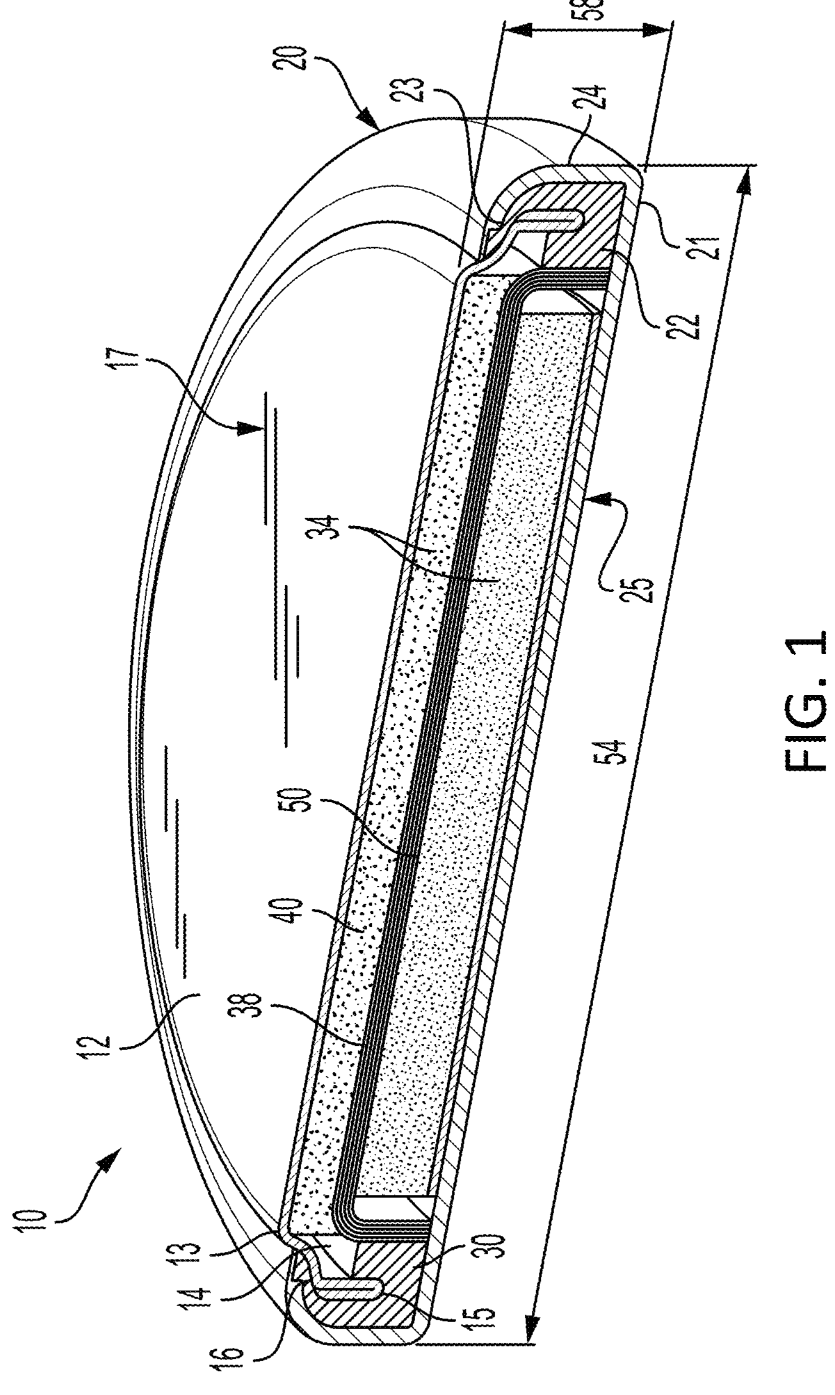

Having thus described the invention in general terms, reference will now be made to the accompanying drawings. The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1 provides a perspective and cross-sectional view of an electrochemical cell, according to embodiments of the present disclosure.

Figure 2:
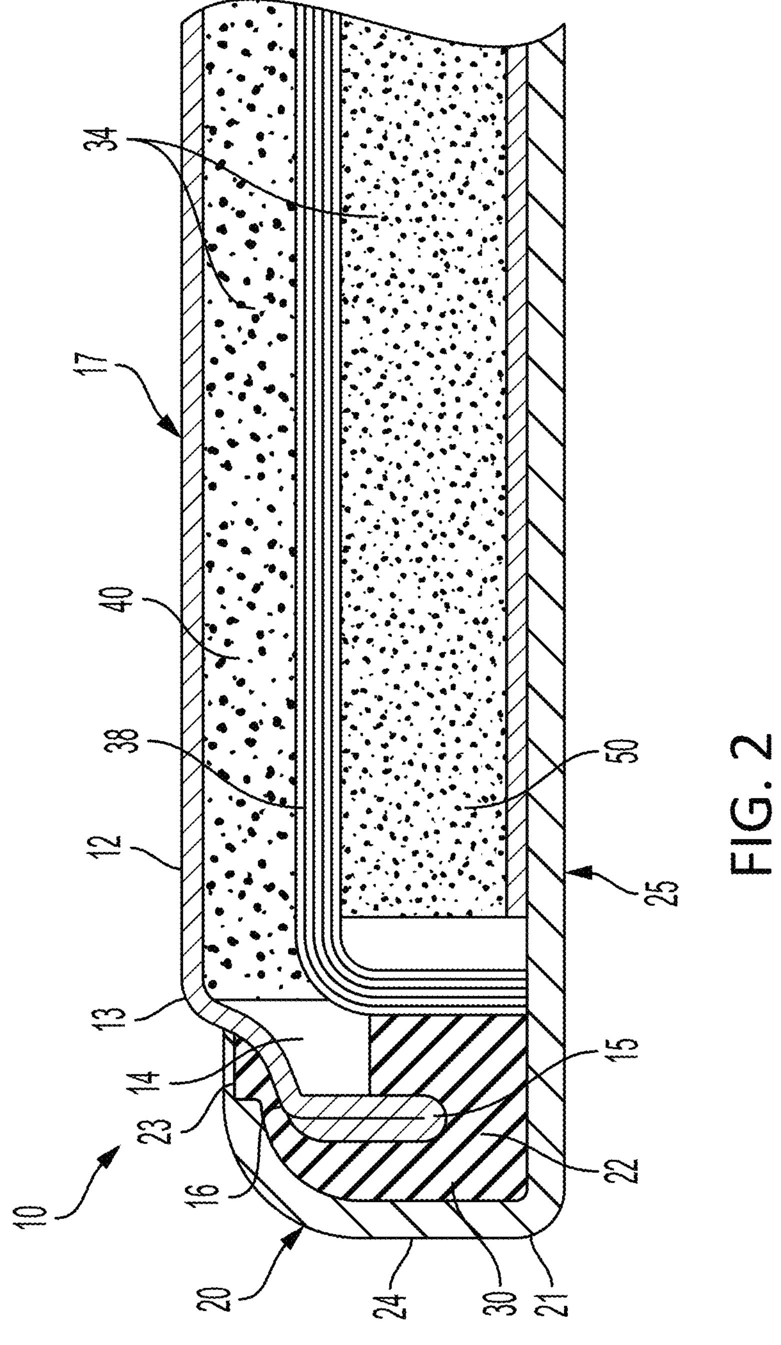

FIG. 2 provides a two-dimensional cross-sectional view of an electrochemical cell, according to embodiments of the present disclosure.

Figure 3:
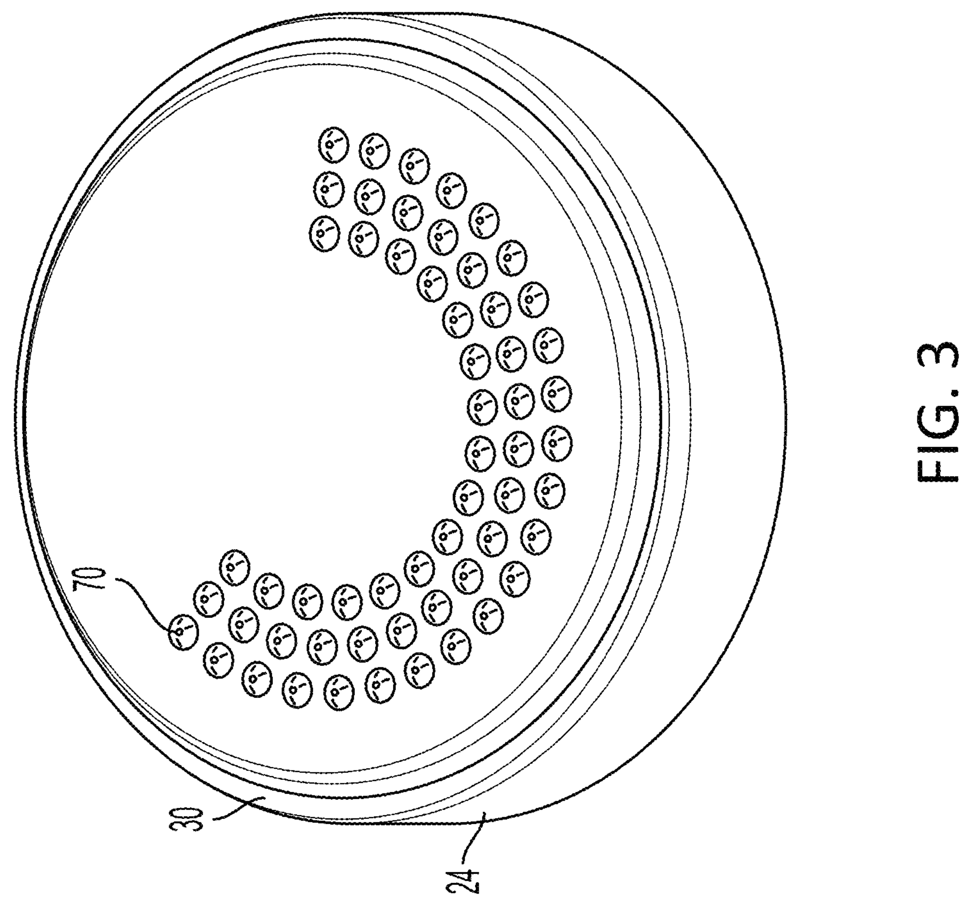

FIG. 3 illustrates an electrochemical cell with an aversive coating applied to the negative terminal in the form of coating dots, according to embodiments of the present disclosure.

Figure 4:
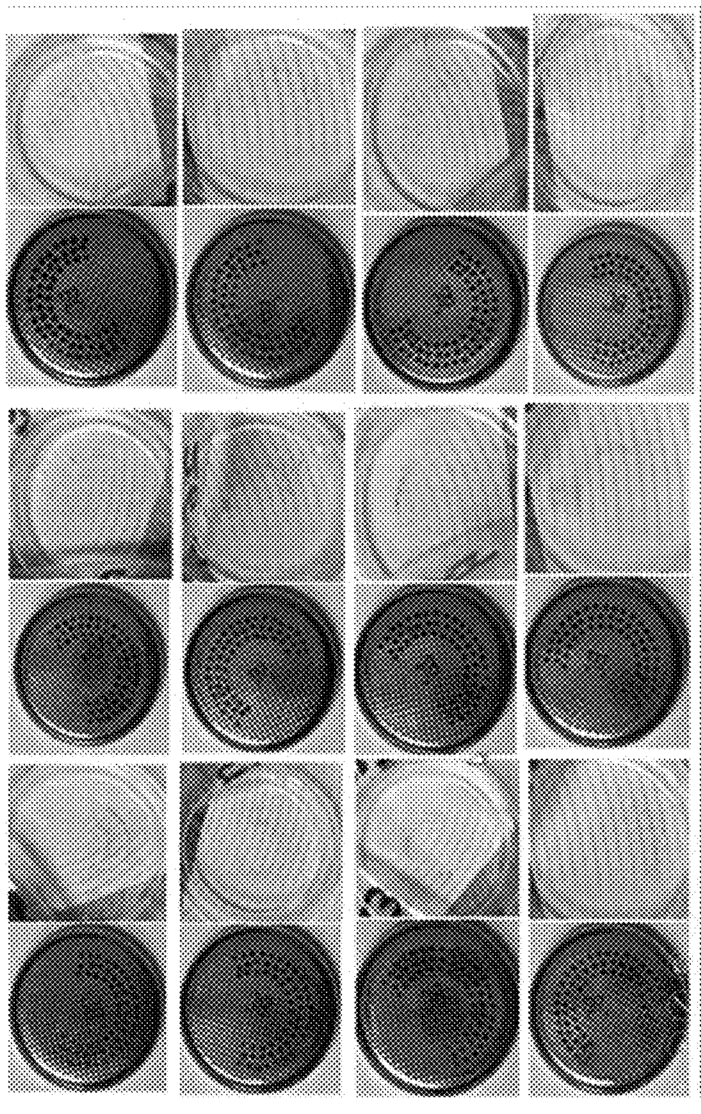

FIG. 4 includes test results showing the aversive coating transfer between the electrochemical cell and the packaging after two weeks, according to embodiments of the present disclosure.

Figure 5A:
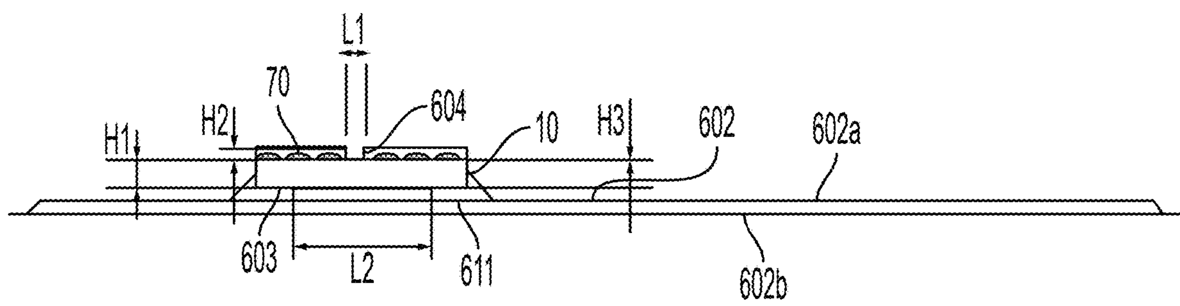

FIG. 5A provides a schematic view of the standoff posts used to prevent contact of the adverse coating and the surface of the package, according to embodiments of the present disclosure.

Figure 5B:
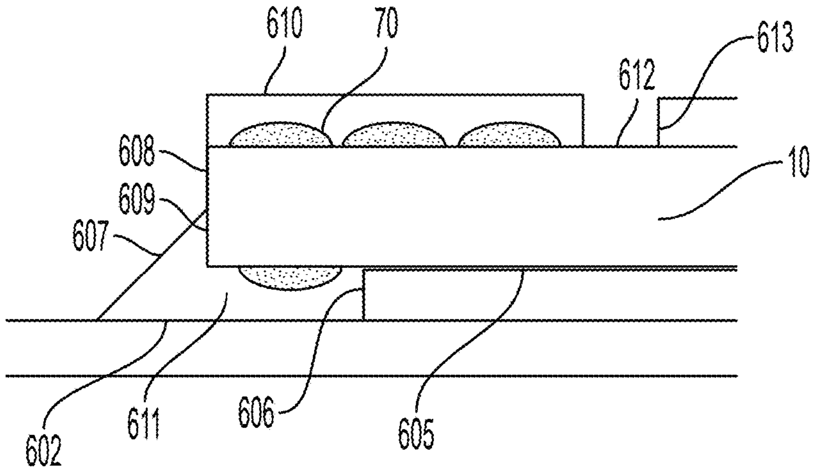

FIG. 5B provides a close-up schematic view of a package design that includes standoff posts, according to embodiments of the present disclosure.

Figure 5C:
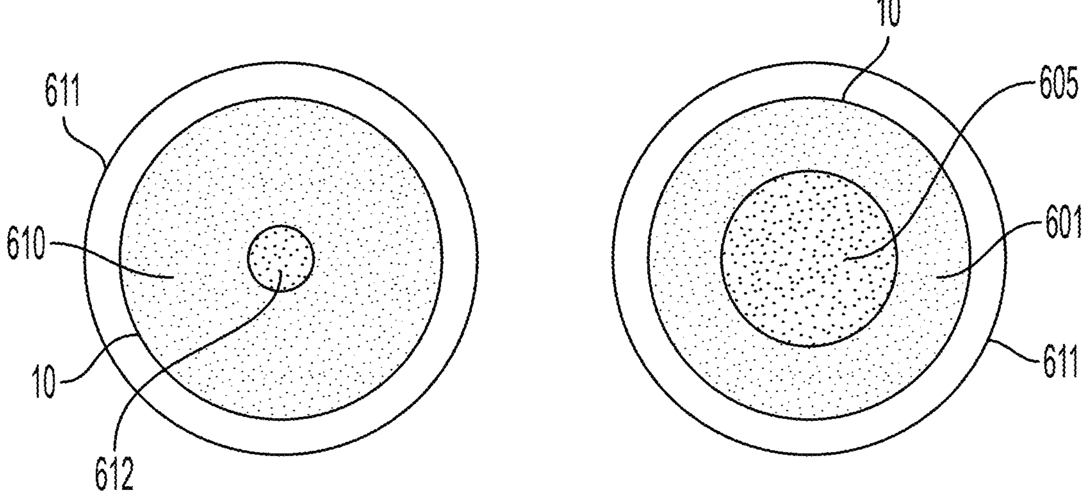

FIG. 5C illustrates a top view of a package design displaying the standoff posts used to prevent contact of the adverse coating to the surface of the package, according to embodiments of the present disclosure.

Figure 6A:
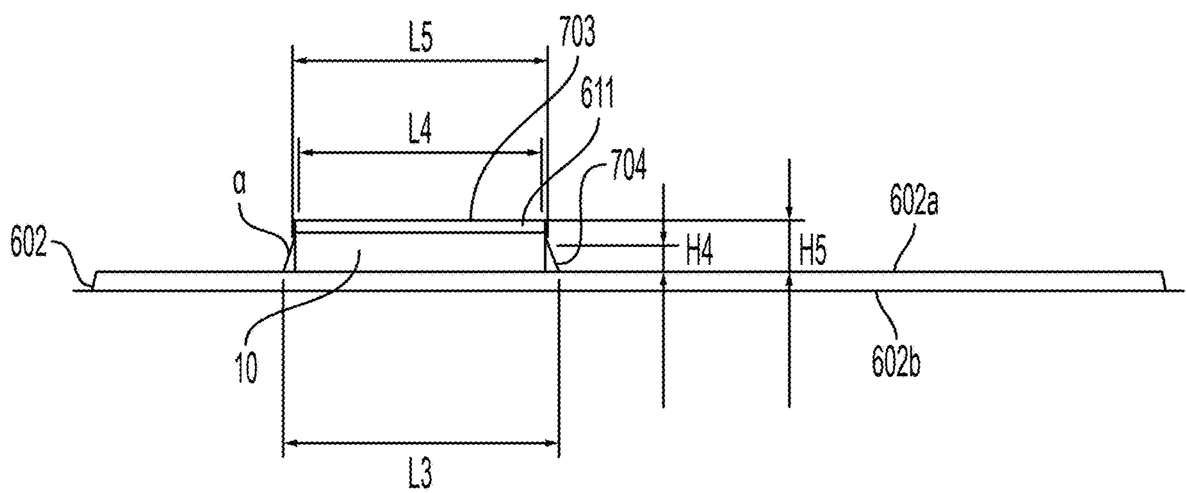

FIG. 6A illustrates a schematic view of a truncated-cone shaped cavity, according to embodiments of the present disclosure.

Figure 6B:
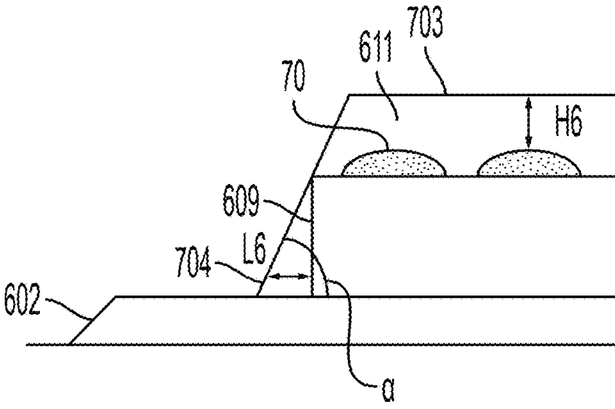

FIG. 6B illustrates a close up schematic of a truncated-cone shaped cavity, according to embodiments of the present disclosure.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Various embodiments of the present disclosure will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

As used herein, the term "substantially" generally means the majority of the structure. Any provided value, whether or not it is modified by term such as "substantially" all refer to and hereby disclose associated values or ranges of values thereabout, as described above.

Designs for battery packages are described herein for preventing the transfer of an aversive coating from the surface of electrochemical cell on to the package.

Overview

Described below is a blister package configured to enclose batteries having a water-soluble aversive coating. The blister package comprises a plurality of features with features that provide a safe and inexpensive way to transport the battery having a water-soluble aversive coating while protecting the water-soluble aversive coating from wearing onto the blister package. For example, the blister package may comprise standoff posts that extend for a certain height into the cavity of a specific cell of the blister package. The battery comes into contact with the top of the standoff post and not the bottom of the cavity. Thus, a space is left surrounding the standoff post that is unoccupied by the battery and is aligned with the coating, so that the coating itself does not contact the blister package. In another example, the cavity is slightly conical in nature. The battery comes into contact with the sidewall of the cavity before it is able to touch the bottom of the cavity. Thus, an unoccupied space is defined between the battery and the bottom of the cavity. The unoccupied space in both of these examples protects the water-soluble aversive coating from wearing from the surface of the battery onto the package.

Coin cell batteries, also known as button cells, are small, single-cell batteries that are typically used to power low-power devices such as watches, calculators, hearing aids, and small electronic devices. These batteries are small and compact, making them easy to use and store, and are available in a wide variety of sizes, chemistries, and voltage ratings.

Coin cell batteries were initially developed for use in hearing aids and are now used in a variety of other applications and devices, such as watches, calculators, and other small electronic devices. Coin cell batteries typically consist of a positive electrode (cathode), a negative electrode (anode), and an electrolyte that allows the flow of ions between the electrodes. The electrodes and electrolyte are enclosed in a small, circular metal casing that is typically made from stainless steel or nickel-plated brass.

The positive electrode is typically made from a metal oxide, such as silver oxide or manganese dioxide, and is coated onto a metal grid or foil. The negative electrode is typically made from a metal such as zinc or lithium and is also coated onto a metal grid or foil. The electrolyte is typically a liquid or gel and is designed to allow the flow of ions between the electrodes.

The electrodes and electrolyte are arranged in a specific configuration within the metal casing, depending on the battery chemistry and voltage rating. For example, in a manganese dioxide-based cylindrical cell, the positive electrode is placed in the center of the battery, while the negative electrode is placed around the outside of the positive electrode. This arrangement allows the battery to deliver a high voltage output while maintaining a small size.

External components include a shell or housing defining an inner volume in which the anode and electrode are housed, kept physically apart by a separator, such as an ion-permeable separator, an electrolyte-permeable separator, or the like. The anode and cathode have different active materials, such as zinc and manganese dioxide, respectively. These materials are selected for their electrochemical properties that allow them to facilitate the flow of electrons from one terminal to the other. The electrolyte is a liquid or gel substance that allows for the movement of ions between the anode and cathode. The electrolyte is often a combination of a salt, such as potassium hydroxide, and water.

Coin cell batteries are available in a wide variety of chemistries, each with its own unique performance characteristics. For example, alkaline coin cell batteries are the most common type of button cell battery and are typically used in low-power devices such as watches, calculators, and small electronic devices. These batteries use an alkaline electrolyte and a zinc-based negative electrode and are available in a wide variety of sizes and voltage ratings. Silver oxide coin cell batteries are typically used in high-power devices such as cameras, calculators, and medical equipment. These batteries use a silver oxide positive electrode and a zinc-based negative electrode and are designed to deliver a high current output and long life. Zinc-air coin cell batteries are typically used in hearing aids and use a zinc-based negative electrode and an air electrode as the positive electrode. However, these battery chemistries often have drawbacks such as off-gassing risk, explosion risk, fire risk, reduced battery life, inconsistent discharge, discharge temperature change issues, and others. Lithium is a popular alternative to other conventional battery chemistries, especially for use in low-power devices such as watches, calculators, and small electronic devices that use coin cell batteries. These batteries typically use a manganese dioxide-based positive electrode and a lithium-based negative electrode.

However, accidental ingestion of coin cells by children can lead to serious injury and even death, in large part due to an electrical current from the battery generating hydroxide (high pH) on the negative terminal or contact. The electrical current at the negative terminal or contact can cause an alkalizing reaction and/or electrolysis reaction when the negative terminal or contact of the battery is in contact with bodily fluids, such as saliva, tissue fluids, mucus, esophageal lining fluids, stomach fluids, or the like. Hydroxides formed during the electrolysis reactions causes alkaline burns and perforations of the mouth, esophagus, stomach lining, and/or intestines. Serious injuries can occur in as little as two hours after ingestion.

To address the dangers inherent in the small size of coin-cell batteries, manufacturers have implemented anti-swallow features. One common anti-swallow feature is a raised border around the circumference of the button cell battery. This border makes it more difficult for a child to swallow the battery, but may only help reduce ingestion by infants, whereas toddlers can still ingest button cell batteries having a raised border about the circumference of the button cell battery. Some manufacturers coat button cell batteries in one or more bitterants, which are bitter-tasting substances, to deter children from putting the button cell battery in their mouths. However, not all infants, toddlers, or even older children are dissuaded from putting a button cell battery coated with a bitterant in their mouth. If swallowed, a coin cell battery or button cell battery, whether coated with a bitterant or having a raised circumferential border, or otherwise modified to dissuade or prevent swallowing behaviorally, will still cause an electrolysis reaction in the child's mouth, esophagus, stomach, or intestines, and will still cause severe injury or death. Therefore, a signal to parents or other care-givers that a battery may have been ingested was created. Such signal was achieved by use of a colorant to stain the mouth, hands, or other areas wetted by body fluids like saliva that have been in contact with a lithium coin cell.

Furthermore, certain aversive agents and binders can wear on the packaging of transport materials, and therefore adding the coating to the exterior of the battery can be ineffective as the coating wears from the battery onto the packing. Therefore, inclusion of a packaging design in which a battery with a coating on it can be stored and transferred without the wear of the coating from the surface of battery is a critical feature. Such a design can be achieved by a plurality of features that provide desirable cavities and protrusions that provide a safe and inexpensive way to transport the battery having a water-soluble aversive coating while protecting the water-soluble coating from wear on the blister package.

In some embodiments, a package to carry an electrochemical cell having a water-soluble aversive coating on at least one terminal comprises two standoff posts that extend into a cavity with contact points with uncoated portions of the electrochemical cell on the sidewall of the cavity while maintaining an unoccupied volume between the electrochemical cell and the blister package. In some embodiments, a package design to carry an electrochemical cell having a water-soluble coating on at least one terminal, comprises a truncated-cone shaped cavity with contact points with uncoated portions of the electrochemical cell on the sidewall of the cavity while maintaining an unoccupied volume between the electrochemical cell and the blister package.

The Battery

FIGS. 1 and 2 provides one arrangement for an electrochemical coin cell 10 that is well-suited to aspects and embodiments of the present disclosure, although the coin cell 10 may assume various alternative orientations and arrangements of components. Further, the specific devices and processes illustrated in the attached drawings and described herein are exemplary embodiments of the inventive concepts defined in the appended claims. Hence, precise dimensions and physical characteristics relating to the embodiments disclosed herein are not to be considered as limiting except to the extent that such dimensions or characteristics are inherent to producing the desired reactions.

The electrochemical coin cell 10, as depicted in FIGS. 1 and 2, also includes a cathode terminal 20 (i.e., the cell can) including a closed end 21, an open end 22 with a terminal edge 23, and a side wall 24 extending between closed end 21 and open end 22. Cathode terminal 20 serves as the positive electrode for the coin cell. In addition, cathode terminal 20 comprising a metallic material, such as titanium, a titanium alloy, titanium nitride, tantalum, niobium, stainless steel, gold, boron-doped diamond, or another electronic conductor. Closed end 21 may also be provided with a composition comprising titanium metal, a titanium alloy, titanium nitride, tantalum, niobium, stainless steel, gold, boron-doped diamond, or another electronic conductor.

Coin cell 10 further includes a gasket 30 that provides a seal between anode terminal 12 and cathode terminal 20 (FIGS. 1 and 2). The gasket 30 is typically made from an electrically nonconductive, elastomeric material, capable of providing a compressive seal between anode terminal 12 and cathode terminal 20. The material used for gasket 30 must also be selected with reference to its stability in the presence of an electrolyte, its resiliency and its resistance to cold flow. Suitable materials for gasket 30 include the following: nylon, polytetrafluoroethylene, fluorinated ethylene-propylene, chlorotrifluoroethylene, perfluoroalkoxy polymer, polyvinyls, polyethylene, polypropylene, polystyrene, polysulfone and the like.

The electrochemical coin cell 10 also includes an electrolyte 34. Various materials can be employed for electrolyte 34 as understood by one with ordinary skill in the art. For example, electrolyte 34 may be composed of a composition of at least one lithium salt dissolved in an organic solvent or a blend of organic solvents. Suitable salts for use in lithium coin cells are lithium trifluoromethanesulfonate, lithium trifluoromethanesulfonimide, lithium perchlorate, lithium tetrafluoroborate, lithium hexafluorophosphate, or their combination. Common organic solvents used in lithium coin cells are propylene carbonate and 1,2-dimethoxyethane.

The electrochemical cell 10 also has an anode 40 disposed in electrical connection with anode terminal 12. As understood by those with ordinary skill in the art, the anode 40 can be composed of various alkaline metals and their alloys with aluminum or magnesium provided that the composition is suitable for serving as an anode in an electrochemical cell.

In one embodiment, anode 40 is primarily composed of lithium material suitable as an anode in an electrochemical cell with a cathode that consists primarily of manganese dioxide.

Electrochemical cell 10 also includes cathode 50 arranged to be in electrical connection with cathode terminal 20. As also understood by those with ordinary skill in the art, cathode 50 can be composed of various materials suitable for use as a cathode in a lithium-based electrochemical cell. In one embodiment, cathode 50 is primarily composed of manganese dioxide.

Electrochemical coin cell 10 further includes a separator 38 disposed between anode 40 and cathode 50 for providing insulation therebetween. Separator 38 can be composed of any of a variety of polymeric materials, for example, that provide electrical insulation between anode terminal 12 and cathode terminal 20. For example, separator 38 may be formed from a polypropylene or polyethylene nonwoven film with thickness of between about 20 μm and about 60 μm.

As also demonstrated by FIGS. 1 and 2, electrochemical cell 10 can be configured in a button- or coin-cell configuration with a total cell external diameter 54 and total cell height 58. The total cell external diameter 54 may be sized from between about 5 mm and about 25 mm and the total cell height 58 may be between about 0.5 mm and about 10 mm. It is generally understood that button or coin cells with these dimensions are most likely to lodge in the esophagus upon accidental ingestion. For example, electrochemical cell 10 may be made in a CR2016 configuration as defined by the International Electrotechnical Commission (IEC) with total cell external diameter 54 having a diameter of about 20 mm and total cell height 58 having a thickness of about 1.6 mm.

Another aspect of the disclosed approach relates to a method of constructing and/or manufacturing a coin cell having the features discussed herein. The method comprises providing a negative electrode active material comprising lithium and disposing said materials in separate halves of an electrically conductive container and providing a nonaqueous, organic liquid electrolyte prior to hermetically sealing the halves of the conductive container to create a battery.

Another aspect of the disclosed approach is the provision and/manufacture of a battery to avoid/mitigate injuries associated with ingestion of said battery, as well as a method for avoiding/mitigating injuries caused by battery ingestion. In these aspects, any of the aforementioned battery designs and constructions may be provided. At their core, the inventive method involves manufacturing an battery and providing said battery for sale and/or use by a consumer.

Non-conductive aversive coatings and methods of preparing electrochemical cells with aversive coatings are described in U.S. Nonprovisional application Ser. No. 18/593,391, filed Mar. 1, 2024; U.S. Nonprovisional application Ser. No. 18/593,527, filed Mar. 1, 2024; U.S. Nonprovisional application Ser. No. 18/593,533, filed Mar. 1, 2024; and U.S. Nonprovisional application Ser. No. 18/593,561, filed Mar. 1, 2024, which are herein incorporated by reference in their entirety.

Aversive Coatings

Aspects of the disclosure relate to aversive coatings for electrochemical cells. An aversive coating is formed by applying a solution comprising an aversive agent and a binder, such as a water-soluble polymer onto a surface (e.g., a surface of a battery) and drying or curing the solution. The aversive coating may additionally comprise other components, such as conductive material. The aversive coating comprises at least one aversive agent, which can be an aversive taste agent such as a bitterant, an aversive smell agent, and/or a salivating agent. An "aversive taste agent" refers to a substance which is bitter, sour, spicy, peppery, or otherwise undesirable in flavor to deter children from eating a battery. An "aversive smell agent" is an odiferous substance with an undesirable smell, such as ammonia or sulfur. A "salivating agent" refers to a substance which induces the production of saliva when in contact with the mouth. The aversive agent composition may also comprise a colorant to alert parents that a child has tried to consume a battery. In certain embodiments, the aversive coating may additionally comprise a colorant.

In some embodiments, the aversive coating has a dry-weight composition comprising 0.5 wt % to 7.0 wt % of an aversive taste agent, 35 wt % to 93 wt % of a water-soluble polymer. In some embodiments, the aversive coating further comprises one or more conductive materials, colorants, and/or additives balancing the dry-weight composition.

The aversive coating comprises at least one aversive taste agent (e.g., a bitterant). In some embodiments, the aversive taste agent is selected from: denatonium benzoate (DNB), capsaicin, allyl isothiocyanate, or piperine. In some embodiments, the aversive taste agent is DNB. In some embodiments, the aversive coating has a dry-weight composition comprising 0.5 wt % to 7.0 wt % of the aversive taste agent. In some embodiments, the aversive coating has a dry-weight composition comprising about 0.5 wt % to about 7.0 wt % DNB. In some embodiments, the aversive coating has a dry-weight composition comprising about 2.0 wt % to about 5.0 wt % DNB.

The water-soluble polymer contained in the aversive coatings acts as a binder to adhere the aversive agent compositions to the electrochemical cell. In some embodiments the dry-weight composition of the aversive coating comprises 35 wt % to 90 wt %, 35 wt % to 85 wt %, 35 wt % to 80 wt %, 35 wt % to 75 wt %, 35 wt % to 70 wt %, 35 wt % to 65 wt %, 35 wt % to 60 wt %, 35 wt % to 55 wt %, 35 wt % to 50 wt %, or 35 wt % to 45 wt % of the water-soluble polymer.

In some embodiments, the water-soluble polymer is selected from: polyvinyl alcohol (PVA), polyacrylic acid (PAA), polyacrylamide, or polyethylene glycol (PEG). In some embodiments the water-soluble polymer is PVA. In some embodiments, the water-soluble polymer has a molecular weight of about 10,000 to about 150,000, about 10,000 to about 100,000, about 50,000 to about 100,000, about 60,000 to about 90,000, about 70,000 to about 80,000, or about 75,000. In some embodiments, the PVA has a molecular weight of about 50,000 to about 100,000. In some embodiments, the PVA has a molecular weight of about 10,000 to about 150,000, about 10,000 to about 100,000, about 50,000 to about 100,000, about 60,000 to about 100,000, about 60,000 to about 90,000, about 70,000 to about 100,000, about 70,000 to about 90,000, or about 70,000 to about 80,000. In some embodiments, the PVA has a molecular weight of about 75,000. In some embodiments, the PVA has a molecular weight of about 72,000. All molecular weights are described as an average mass in grams per mole.

Polyvinyl alcohol is prepared from polyvinyl acetate by hydrolyzing ester functional groups to hydroxyl functional groups. The degree to which polyvinyl alcohol has been hydrolyzed can vary. For PVA that has been 80% hydrolyzed, approximately 80% of the monomer units contain hydroxyl groups and approximately 20% of the monomer units contain acetate. In some embodiments, the PVA is about 70% to 100% hydrolyzed, about 70% to about 99% hydrolyzed, about 80% to about 99% hydrolyzed, about 85% to about 95% hydrolyzed, about 80% to about 90% hydrolyzed, or about 85% to about 90% hydrolyzed. In some embodiments, the PVA is about 80% to about 95% hydrolyzed. In some embodiments, the PVA is about 88% hydrolyzed. In some embodiments, the PVA has a molecular weight of about 75,000 and is about 88% hydrolyzed.

In some embodiments, the aversive coatings include a conductive material added in a sufficient concentration to exceed the percolation threshold for the polymeric matrix, allowing for the conduction of electricity through the coating. The percolation threshold is the concentration of the solid conductive material above which the electrical conductivity of the composition increases exponentially. At the percolation threshold, conductive particles are in electrical contact with one another within the coating, thereby creating conductive pathways through the coating. As the concentration of conductive material increases above the percolation threshold, the number of conductive pathways increases, thereby increasing the conductivity of the overall coating. The conductive material allows the flow of electric current through the material. The conductive material may be metal or non-metal. The conductive material can be natural, i.e., mined, or synthetic, i.e., manufactured.

In some embodiments, the conductive material comprises carbon. In some embodiments, the conductive material is carbon black, graphite, expanded graphite, graphene, or carbon nanotubes. In some embodiments, the conductive material is carbon black. Carbon black is a form of amorphous carbon obtained from the partial combustion of hydrocarbons. Graphene is composed of a single layer of $sp^2$-hybridized carbon atoms with trigonal planar geometry bound in a hexagonal honeycomb lattice structure. Graphite is a crystalline form of carbon comprising multiple stacked layers of graphene. Graphite is naturally occurring in metamorphic rocks, but synthetic graphite can also be produced at high temperatures. The relatively weak van der Waals forces which include $\pi$-$\pi$ interactions between layers of graphite can be dissociated by thermal or mechanical treatment and/or intercalation with another chemical to produce expanded graphite (or expandable graphite). For example, natural graphite can be treated with acid and an oxidizing agent and heated to produce expanded graphite with an increased volume. The conductive material may comprise expanded or non-expanded graphite. Suppliers of graphite include Timcal America of Westlake, Ohio; Superior Graphite Company of Chicago, Ill.; and Lonza, Ltd. of Basel, Switzerland.

Carbon nanotubes are an allotrope of carbon having a hollow tube structure with $sp^2$-hybridized carbon atoms in a trigonal planar geometry bound in a hexagonal honeycomb lattice (i.e., rolled up graphene structure). Carbon nanotubes can be single-walled, typically with a diameter of 0.5 to 2.0 nm, or they can be multi-walled with multiple concentric layers of nested tubes, which can have larger diameters, such as 7 to 100 nm. The typical length of carbon nanotubes is in the range of hundreds of nanometer to tens of micrometers, but they can be up to around 1 mm long.

When conductive material is present, the dry-weight composition of the aversive coating comprises 3 wt % to 55 wt % of the conductive material. In some embodiments, the dry-weight composition of the aversive coating comprises 6 wt % to 55 wt % of the conductive material. In some embodiments, the dry-weight composition of the aversive coating comprises 9 wt % to 30 wt % of the conductive material. In some embodiments, the dry-weight composition of the aversive coating comprises 12 wt % to 23 wt % of the conductive material. In some embodiments, the dry-weight composition of the aversive coating comprises 12 wt % to 23 wt % of carbon black.

In some embodiments, the aversive coating further comprises a colorant. In some embodiments the dry-weight composition of the aversive coating comprises 0.5 wt % to 60 wt % of a colorant. In some embodiments the dry-weight composition of the aversive coating comprises 5 wt % to 55 wt %, 10 wt % to 55 wt %, 20 wt % to 55 wt %, 30 wt % to 55 wt %, 35 wt % to 55 wt %, 35 wt % to 50 wt %, or 35 wt % to 45 wt % of the colorant. In some embodiments, the colorant comprises FD&C Blue No. 1 (Brilliant Blue FCF), FD&C Blue No. 2 (Indigotine), FD&C Green No. 3 (Fast Green FCF), FD&C Red No. 3 (Erythrosine), FD&C Red No. 40 (Allura Red AC), FD&C Yellow No. 5 (Tartrazine), or FD&C Yellow No. 6 (Sunset Yellow). In some embodiments, the aversive coating comprises FD&C Blue No. 1.

In some embodiments, one or more additives of the aversive coating comprise an adhesion promoter. The addition of an adhesion promoter may help the aversive coating to better adhere to the surface of an electrochemical cell. In some embodiments, the dry-weight composition of the aversive coating comprises 0.1 wt % to about 5.0 wt % of the adhesion promoter. In some embodiments, the adhesion promoter is Lubrizol 2063, Lubrizol 2062, DowSil Z-6137, DowSil 3-6121, PP-6 (PP water from Marabin Environmental Conservation Printing Ink Co. Ltd), BYK-4509, or BYK-4510. In some embodiments, the adhesion promoter is Lubrizol 2063, a hydroxy and carboxy functionalized phosphate ester.

In some embodiments, one or more additives of the aversive coating comprise a surfactant. Surfactants reduce the surface tension of a solution and may act as wetting agents and dispersants to assist in the application of the aversive coating to an electrochemical cell. In some embodiments, the dry-weight composition of the aversive coating comprises 0.01 wt % to about 1.0 wt % of the surfactant. In some embodiments, the surfactant is an alkyl sulfate, an alkyl ether sulfate, an alkyl benzene sulfonate, a polyoxyethylene ether, a phosphate ester, or a carboxylate. In some embodiments, the surfactant is sodium dodecyl sulfate (SDS), sodium lauryl ether sulfate (SLES), sodium stearate, Triton X-100, polysorbate 20 (Tween® 20), or dioctyl sodium sulfosuccinate (DOSS). In some embodiments, the surfactant is sodium dodecyl sulfate (SDS).

In some embodiments, the one or more additives of the aversive coating comprise a viscosity modifier to aid in dispensing a solution comprising the aversive coating. In some embodiments, the dry-weight composition of the aversive coating comprises 0.01 wt % to about 2.0 wt % of the viscosity modifier. In some embodiments, the viscosity modifier is a carbomer, a high molecular weight synthetic polymer of acrylic acid and allyl sucrose or allyl pentaerythritol, such as Carbopol® (e.g., Aqua SF-1, Aqua SF-3, Aqua CC, Silk 100, SC-800, 980 polymer, Ultrez 10, Ultrez 21) or Pemulen™ (e.g., TR-1, TR-2, EZ-4U). In some embodiments, the viscosity modifier is polyethylene glycol (PEG), which can have various molecular weights, such as PEG-400. In some embodiments, the viscosity modifier is a natural polysaccharide, such as xanthan gum, guar gum, or cellulose gum. In some embodiments, the viscosity modifier is a cellulose derivative such as carboxymethyl cellulose (CMC) or hydroxyethyl cellulose (HEC). Examples of viscosity modifiers include but are not limited to Viscolam®, Esaflor®, Ammonyx®, Ninol®, and Amphosol® thickening agents. In some embodiments, the viscosity modifier is carboxymethyl cellulose (CMC).

As one example, the aversive coating has a dry-weight composition comprising about 2.0 wt % to about 5.0 wt % DNB, about 70 wt % to about 95 wt % PVA. Certain embodiments may comprise other components, such as conductive materials (e.g., carbon black).

Electrochemical Cells Having a Coating Thereon

Aspects of the disclosure relate to electrochemical cells coated in the aversive coatings described herein. The electrochemical cells comprise a positive terminal defining a first portion of an exterior of the electrochemical cell; a negative terminal that is electrically insulated from the positive terminal and defining a second portion of the exterior of the electrochemical cell; an anode positioned within an interior of the electrochemical cell and in electrical connection with the negative terminal; and a cathode positioned within the interior of the electrochemical cell, wherein the cathode is electrically separated from the anode and is in electrical connection with the positive terminal. At least a portion of the exterior surface of the electrochemical cell is coated with the aversive coatings provided herein. The electrochemical cell conducts electricity through the conductive aversive coating on the positive terminal and/or the negative terminal.

In some embodiments, the electrochemical cell is a button cell or a coin cell. In some embodiments, the electrochemical cell is a lithium coin cell. Lithium coin cells include but are not limited to CR1025, CR1216, CR1616, CR1620, CR1632, CR2016, CR2025, CR2032, CR2430, and CR2450 batteries. Coin cell batteries commonly have diameters of 10 mm, 16 mm, 20 mm, and 24 mm, which provide terminal areas of approximately 79 mm$^2$, 201 mm$^2$, 314 mm$^2$, and 452 mm$^2$ respectively.

Certain embodiments comprise electrochemical cells having an aversive coating covering at least part of at least one cell terminal (e.g., the positive terminal or the negative terminal). For example, the positive terminal may be coated with the aversive coatings, the negative terminal may be coated with the aversive coatings, or a portion of the positive terminal and/or a portion of the negative terminal may be coated with the aversive coatings (e.g., greater than 50%, by area, of the positive terminal; greater than 50%, by area, of the negative terminal; less than 50% by area, of the positive terminal; or less than 50%, by area, of the negative terminal).

In some embodiments, greater than 50% by area, greater than 60% by area, greater than 70% by area, greater than 75% by area, greater than 80% by area, greater than 85% by area, or greater than 90% by area of the positive terminal and/or the negative terminal is coated by the aversive coating. In some embodiments, 3% to 99% by area, 5% to 95% by area, 10% to 90% by area, 15% to 85% by area, 20% to 80% by area, 25% to 75% by area, 25% to 70% by area, 30% to 65% by area, 30% to 60% by area, 35% to 55% by area, 40% to 50% by area, 30% to 50% by area, 20% to 50% by area, 10% to 50% by area, or 5% to 50% by area of the positive terminal and/or negative terminal is coating by the aversive coating.

FIG. 3 shows an example of a coin cell with the aversive coating applied to portions of the exterior surface of the negative terminal. In the illustrated example, the aversive coating is applied in a series of dots 70 collectively covering a portion of a negative terminal. The series of dots is provided to form an arc on the surface of the battery. However, it should be understood that other patterns may be used, such as stripes, rings, ovals, squares, rectangles, diamonds, triangles, half-circles or half-moon shapes. To prevent or reduce interference with the performance of the battery, the aversive coating may be located inside of a diameter of about 14.0 mm and outside of a diameter of about 8.2 mm from the center of a terminal of a coin cell.

In some embodiments, the aversive coating is applied in a series of dots covering a portion of a negative terminal. In some embodiments, the aversive coating is applied as a plurality of dots forming an arc-shaped, ring-shaped, half-circle-shaped, or half-moon shaped area on the positive and/or negative terminal. In some embodiments, the dots have a diameter of about 0.7 mm to about 1.0 mm. In some embodiments, the area of the positive and/or negative terminal coated in aversive coating comprises a plurality of sub-arcs or sub-rings (e.g., concentric sub-arcs or sub-rings). In some embodiments, the area of the positive and/or negative terminal coated in aversive coating comprises 2, 3, 4, or 5 sub-arcs or sub-rings.

The aversive coating may also be applied in patterns including but not limited to stripes, rings, ovals, squares, rectangles, diamonds, triangles, half-circles or half-moon shapes. In some embodiments, the aversive coating is applied as one or more rectangular shapes. In some embodiments, the aversive coating is applied on two rectangular areas across the positive and/or negative terminal.

In some embodiments, the electrochemical cell is a coin cell or a button cell and the total area covered by aversive coating is about 10 mm$^2$ to about 200 mm$^2$, about 20 mm$^2$ to about 200 mm$^2$, about 30 mm$^2$ to about 200 mm$^2$, about 40 mm$^2$ to about 200 mm$^2$, about 50 mm$^2$ to about 200 mm$^2$, or about 50 mm$^2$ to about 100 mm$^2$.

In some embodiments, the aversive coating has a conductivity greater than 0.00001 S/m. In some embodiments, the aversive coating has a conductivity between 0.00001 S/m and 0.1 S/m.

In some embodiments, the electrochemical cell with greater than 50% area of the positive terminal and/or negative terminal coated by the aversive coating maintains a resistance of less than 68,000Ω, less than 60,000Ω, less than 50,000Ω, less than 40,000Ω, less than 30,000Ω, less than 20,000Ω, less than 10,000Ω, or less than 1,000Ω. In some embodiments, the electrochemical cell with greater than 50% area of the positive terminal and/or negative terminal coated by the aversive coating maintains a resistance of less than 100Ω. Resistance ( $$\left(\text{e.g. } \frac{\text{voltage}}{\text{current}}\right)$$

) is affected by the conductivity of the aversive coating and the percentage of the area of the terminal that is coated in the aversive coating. For an electrochemical cell with a terminal coated in the aversive coating to maintain adequate performance, resistance from the coating must be sufficiently low. However, the threshold of a sufficiently low resistance to maintain performance may vary based on the type and application of the electrochemical cell. Electrochemical cells used in low-rate applications such as watch batteries use a constant, low current and thus can maintain performance with higher resistance from the aversive coating. For example, a CR2032 lithium coin cell used could have a thicker layer of aversive coating with a resistance of less than 68,000Ω, such as 10,000Ω while maintaining functionality as a watch battery. However, for electrochemical cells designed for higher rates of discharge, such as key fob batteries which use short bursts of higher currents, a lower resistance is necessary for performance. For an alkaline coin or button cell, such as an LR44 battery used in a key fob, to provide a current of 10 mA the resistance should be less than 100Ω to maintain a voltage of 1V. Accordingly, a more conductive aversive coating with very low resistance (<100Ω) may be used for devices with higher rates of discharge.

In some embodiments, the thickness of the aversive coating is greater than 1 μm. In some embodiments, the thickness of the aversive coating is about 1 μm to about 100 μm. In some embodiments, the thickness of the aversive coating is about 15 μm to about 20 μm.

In some embodiments, the total dry-weight amount of aversive coating applied to the electrochemical cell is about 0.2 mg to about 1.2 mg. In some embodiments, the total dry-weight amount of aversive coating applied to the electrochemical cell is about 0.4 mg to about 0.5 mg.

For sufficient aversive properties, at least 1 μg of an aversive taste agent is applied to each electrochemical cell. An amount of 1 μg of an aversive taste agent such as DNB has been found to be a sufficient quantity to provide an undesired taste to deter a child from eating an electrochemical cell. In some embodiments, the total amount of aversive taste agent applied to the electrochemical cell is between 1 μg to 50 μg, between 5 μg to 50 μg, between 5 μg to 40 μg, between 5 μg to 30 μg, between 10 μg to 30 μg, or between 10 μg to 25 μg. In some embodiments, the total amount of aversive taste agent applied to the electrochemical cell is about 25 μg.

Package

FIG. 4 illustrates test results demonstrating wear of a coating with a blue colorant from an electrochemical cell 10 onto a package that is not designed in accordance with the present disclosure. The aversive coating 70 wore from the surface of the electrochemical cell 10 on to the blister package over the course of two weeks. Embodiments of the current disclosure are provided to prevent the transfer of the colorant from the surface of the electrochemical cell on to the package.

FIGS. 5A, 5B, 5C, 6A, and 6B illustrate various embodiments directed to a blister package 602 which comprises a first plastic panel 602*a* and a second plastic panel 602*b*. The first plastic panel 602*a* has a first planar portion. The second plastic panel 602*b* has a second planar portion. The second plastic panel 602*b* is secured to the first plastic panel 602*a* such that the first planar portion is in a first plane parallel and adjacent to the second planar portion in a second plane. The second plastic panel 602*b* may be secured to the first plastic panel 602*a* by a hinge, clamshell, separate panels that are welded together, etc. The first plastic panel 602*a* or the second plastic panel 602*b* defines a cavity 611 which has one open side surrounded by either the first planar portion or the second planar portion. The side opposite of the open side, between the first plastic panel 602*a* and the second plastic panel 602*b* is closed. The cavity 611 is formed to hold the electrochemical cell 10. The closed planar side is parallel with the first planar portion or the second planar portion depending on the embodiment of the claims. If the open side is surrounded by the first planar portion, a section of the first plastic panel 602*a*, the closed side will be surrounded by the second planar portion. If the second planar portion, a section of the second plastic panel 602*b*, surrounds the open side, the closed side will be surrounded by the first planar portion, a part of the first plastic panel 602*a*. A substantially cylindrical sidewall 608 extends between the closed planar side and one of the first planar portion or the second planar portion to the opposite planar portion.

FIGS. 5A, 5B, and 5C provide, according to one or more embodiments of the present disclosure, an exemplary design for preventing the transfer of the aversive coating 70 from the electrochemical cell 10 on to the package 602.

As shown in FIGS. 5A and 5B, the package for an electrochemical cell 10 having a water-soluble coating 70 on at least one terminal comprises a first plastic panel 602*a* having a first planar portion and a second plastic panel 602*b* having a second planar portion. Together the first plastic panel 602*a* and the second plastic panel 602*b* create the blister package 602. The second plastic panel 602*b* is secured to the first plastic panel 602*a* such that the first planar portion in a first plane parallel and adjacent to the second planar portion in a second plane. The second plastic panel 602*b* may be secured to the first plastic panel 602*a* by a hinge, clamshell, separate panels that are welded together, etc. Thus, the blister package 602 is a closed system because the first planar portion is both parallel and adjacent to second planar portion. The first plastic panel 602*a* or the second plastic panel 602*b* defines a cavity 611 having an open side that is surrounded by the first planar portion or the second planar portion and is closed between the first plastic panel 602*a* and the second plastic panel 602*b*. This open side is where the electrochemical cell 10 is inserted into the cavity for transport.

The cavity 611 is defined by a closed planar side opposite the open side and parallel with at least one of the first planar portion of the second planar portion and an at least substantially cylindrical sidewall 608 extending between the closed planar side and one of the first planar portion or the second planar portion surrounding the cavity.

In some embodiments, the first plastic panel 602*a* or the second plastic panel 602*b* defines a standoff post 604 extending from the closed planar side and having a distal end 612 extending into the cavity and spaced away from the sidewall to define an unoccupied volume surrounding the standoff post 604 and spaced apart from the other of the first plastic panel or the second plastic panel to define a battery-placement cavity 611.

As show in FIG. 5A, the standoff post 604 has a height H2 between approximately 20%-50% of an interior height of the cavity H1. The interior height of the cavity is measured perpendicular to the closed planar side. The difference in H1 and H2 is the height H3 of the electrochemical cell 10. The difference allows for space between the electrochemical cell 10 surface and the surface of the plastic panel 602*a* or 602*b* to prevent the transfer of the coating 70 from the surface of the electrochemical cell 10.

FIG. 5B provides an electrochemical cell 10 coated with an aversive coating 70 in a packaging system to prevent the transfer of the aversive coating 70 from the surface of the electrochemical cell 10. In some embodiments, the aversive coating 70 covers between about 2% to 50% of an area of the exterior of at least one terminal of the electrochemical cell. The aversive coating 70 composition comprises at least one aversive taste agent and a colorant.

Furthermore, in FIG. 5B, the architecture of the respective standoff posts 603 and 604 are defined by the distal ends, 605 and 612, of the respective standoff posts, 603 and 604, extending into the cavity, and the sidewall of the respective standoff posts being, 606 and 613. More specifically, the sidewall of the distal end of the standoff posts extends for a certain height H2 while the diameter of the standoff post is defined by the top of the distal ends 605 and 612.

In some embodiments, the cavity defines contact points with uncoated portions of the electrochemical cell while maintaining an unoccupied volume. The occupied volume exists between the base plastic portion 610 and the electrochemical cell 10 as well as the cover plastic portion 601 and the opposite side of the electrochemical cell. These contact points of the cavity are standoff posts 603 and 604. As seen in FIG. 5B, the standoff posts have respective distal ends 612 and 605. These are the specific contact points of the cavity. The standoff post ends 612 and 605 contact a portion of the electrochemical cell 10 that are void of the aversive coating 70.

Further, in FIG. 5B the sidewall of the electrochemical cell 609 is in contact with substantially cylindrical sidewall 608. Thus, the contact points of the package with the electrochemical cell are 605, 612, and 608. The electrochemical cell 10 is void of the aversive coating 70 at each point where the electrochemical cell comes into contact with the package, those points being the distal ends extending into the cavity, 605 and 612, as well as the substantially cylindrical sidewall 608.

In some embodiments, a section of the sidewall of the cavity 611 is angled inward, implying a conical shape. More specifically, as shown in FIG. 5B, the sidewall of the cavity is made up of an angled sidewall 607 and a straight sidewall 608. More than 50% of the sidewall is made up of the straight sidewall and is thus, substantially cylindrical.

The water-soluble aversive coating is positioned outside of a circular area on the first terminal of the packaged electrochemical cell 10. The first contact point is on a second terminal, opposite the first terminal and a second contact point is inside the circular area and prevents the water-soluble aversive coating from contacting the package. The second contact point is a planar distal end of a standoff post extending into the cavity. The planar distal ends 605 and 612 of the standoff post is circular and has a diameter smaller than a diameter of the circular area.

FIG. 5C is a top view of the first embodiment of the claims in which standoff posts create an unoccupied volume to act as a buffer between the aversive coating 70 and the plastic panels 602*a* and 602*b*. The cavity 611 defines contact points with uncoated portions of the electrochemical cell 10 while maintaining an unoccupied volume. The occupied volume exists between the base plastic portion 610 and the electrochemical cell 10 as well as the cover plastic portion 601 and the opposite side of the electrochemical cell. These contact points of the cavity are standoff posts 603 and 604. The standoff posts have respective distal ends 612 and 605. They are the specific contact points of the cavity. The standoff post ends 612 and 605 contact a portion of the electrochemical cell 10 that are void of the aversive coating 70.

FIGS. 6A and 6B illustrate another embodiment of the claims, which comprises a first plastic panel 602*a* and a second plastic panel 602*b*. The first plastic panel has a first planar portion. The second plastic panel has a second planar portion. The second plastic panel 602*b* is secured to the first plastic panel 602*a* such that the first planar portion is in a first plane parallel and adjacent to the second planar portion in a second plane. The second plastic panel 602*b* may be secured to the first plastic panel 602*a* by a hinge, clamshell, separate panels that are welded together, etc. The first plastic panel 602*a* or the second plastic panel 602*b* defines a cavity which has one open side surrounded by the first planar portion or the second planar portion. The side opposite of the open side, between the first plastic panel 602*a* and the second plastic panel 602*b* is closed. Thus, a cavity 611 is formed to hold the electrochemical cell 10 with an open side and a closed planar side. The closed planar side is parallel with the first planar portion or the second planar portion depending on the embodiment of the claims. If the open side is surrounded by the first planar portion a section of the first plastic panel 602*a*, the closed side will be surrounded by the second planar portion. If the second planar portion a section of the second plastic panel 602*b* surrounds the open side, the closed side will be surrounded by the first planar portion a part of the first plastic panel 602*a*. A substantially cylindrical sidewall 704 extends between the closed planar side and one of the first planar portion or the second planar portion to the opposite planar portion. The closed planar side 703 has a diameter less than a diameter of the open side and a sidewall 704 extending between the closed planar side and the first planar portion. The sidewall 704 and the closed planar side 703 of the truncated-cone shaped that is coplanar with the first planar defines an interior angle α between 45°-85°. More specifically, the interior angle is between 75° and 85° The closed planar side 703 of the truncated-cone shaped cavity has a diameter less than 20 mm.

FIG. 6A and FIG. illustrate certain embodiments, wherein the cavity defines an at least substantially cylindrical sidewall 704 extending between the closed planar side and one of the first planar portion or the second planar portion surrounding the cavity. The substantially cylindrical sidewall 704 defines a circular cavity 611 that has sidewalls that extend for a certain height H5. In some embodiments, the cavity 611 may be defined a truncated-cone shaped.

Furthermore, FIGS. 6A and 6B provide an illustration which demonstrates the difference in lengths and heights to achieve an unoccupied volume between the plastic panels and the electrochemical cell 10. Firstly, the length of the open side of the cavity is defined as L3. The length of the electrochemical cell 10 is defined as L5 and the length of the closed planar portion of the cavity is defined as L4. The unoccupied volume of the package is created by the difference in L3 and L4 such that L3 is larger than L4 and L5 such that the electrochemical cell 10 is too large in diameter to fit into the L3 dimension and thus will "float" in the cavity 611. This is due to the fact the electrochemical cell 10 contacts the sidewall of the cavity 704 before touching the closed planar side 703 of the cavity 611. The difference in these lengths is show in FIG. 6B by L6, the distance of the electrochemical cell 10 to the angled sidewall 704 at the top of the open side. In addition, the angle at which the sidewall is disposed creates the difference in lengths defined by angle α in FIG. 6B. Angle α in FIG. 6B. and angle β in FIG. 6A are equal to each other. Furthermore, the unoccupied volume is defined by the difference in heights of the electrochemical cell 10 and the cavity 611. The height of the cavity 611 is H5 and the height of the electrochemical cell 10 is H4, thus the volume of the occupied space is the difference between H5 and H4 which is defined in FIG. 6B as H6.

FIG. 6B shows the placement of the aversive coating 70 on the electrochemical cell 10 in relation to the second embodiment of the present disclosure. The contact point of some embodiments of the claims is defined by the sidewall of the cavity 611. The water-soluble aversive coating 70 is positioned inside a first circular area on the first terminal and a first contact point is on a second terminal, opposite the first terminal and a second contact point is outside of the second circular area and prevents the water-soluble aversive coating from contacting the package. Thus, the aversive coating is deposited on the perimeter of the surface of the electrochemical cell. The second contact point is a ring-shaped contact point surrounding the water-soluble aversive coating. The water-soluble aversive coating is positioned outside of a first circular area on the first terminal; and wherein a first contact point is on a second terminal, opposite the first terminal; and a second contact point is inside the second circular area and prevents the water-soluble aversive coating from contacting the package.

In some embodiments, a packaged electrochemical cell comprises a positive terminal defining a first portion of an exterior of the electrochemical cell, a negative terminal that is electrically insulated from the positive terminal and defining a second portion of the exterior of the electrochemical cell, an anode positioned within an interior of the electrochemical cell and in electrical connection with the negative terminal, and a cathode positioned within the interior of the electrochemical cell, wherein the cathode is electrically separated from the anode and is in electrical connection with the positive terminal. A water-soluble aversive coating covering 2% to 50% of an area of the exterior of a first terminal selected from the positive terminal or the negative terminal. The package surrounding the electrochemical cell comprises a first plastic panel having a first planar portion and a second plastic panel having a second planar portion. The second plastic panel is secured to the first plastic panel such that the first planar portion in a first plane parallel and adjacent to the second planar portion in a second plane. The second plastic panel 602*b* may be secured to the first plastic panel 602*a* by a hinge, clamshell, separate panels that are welded together, etc. The first plastic panel or the second plastic panel defines a cavity for housing the electrochemical cell therein. The cavity has an open side that is closed between the first plastic panel and the second plastic panel. The closed planar side opposite the open side and parallel with at least one of the first planar portion of the second planar portion. The cavity also defines a sidewall extending between the open side and the closed planar side. The cavity also defines contact points with uncoated portions of the electrochemical cell while maintaining an air gap at the water-soluble aversive coating.

In some embodiments, the water-soluble aversive coating is positioned inside a first circular area on the first terminal. A first contact point is on a second terminal, opposite the first terminal. A second contact point is outside of the second circular area and prevents the water-soluble aversive coating from contacting the package.

In some embodiments, the second contact point is a ring-shaped contact point surrounding the water-soluble aversive coating and is defined by the sidewall of the cavity.

In some embodiments, the water-soluble aversive coating is positioned outside of a first circular area on the first terminal. The first contact point is on a second terminal, opposite the first terminal. The second contact point is inside the second circular area and prevents the water-soluble aversive coating from contacting the package. The second contact point is a planar distal end of a standoff post extending into the cavity. The planar distal end of the standoff post is circular and has a diameter smaller than a diameter of the circular area.

In some embodiments, the water-soluble aversive coating is positioned outside of a first circular area on the first terminal and outside of a second circular area on the second terminal. The first contact point is a distal end of a first standoff post extending into the cavity that contacts the first terminal inside the first circular area. The second contact point is a distal end of a second standoff post extending into the cavity that contacts the second terminal inside the second circular area.

In some embodiments, the sidewall of the cavity defines a third contact point with the electrochemical cell, and wherein the electrochemical cell has a first diameter and the cavity has a second diameter larger than the first diameter, and the second diameter is sized such that a side of the electrochemical cell contacts the sidewall before the first standoff post or the second standoff post contacts the water soluble coating when the electrochemical cell moves within the package.

In some embodiments, the packaging material may comprise of polyvinyl chloride (PVC), polyethylene terephthalate (PET), or other thermoplastic polymers. PET is the most common packaging material due to environmental regulation. In some embodiments, the blister packages may comprise of 0.2 mm or 0.3 mm sheets of PVC. In some embodiments, PVDC is combined with PVC sheets to create blister packages with an extra layer of protection. The addition of another polymer allows for improved sealing of items form oxygen and moisture. In some embodiments, the blister packages may comprise PCTFE. PCTFE may be used for forming a moisture barrier around the product due to the low water vapor permeability characteristic of PCTFE.

In some embodiments, the bister package comprises a material that has a low flex. Thus, when the blister package is being transported and incurs obstacles which cause the package to bend and flex, the material is stiff enough to not bend or flex under this medial amount of pressure. Thus, the battery and the aversive coating do not come into contact with the blister package when the package flexes, leaving the coating intact after transportation or stress.

In some embodiments, the vertical crushing force has little no to effect on the blister package. This is due to a sufficiently small distance between the sidewall of the cavity and the edge of the standoff post. This component cannot collapse during typical movement of a package during transportation and vending.

CONCLUSION

Many modifications of the embodiments set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in the present specification and attached claims are approximations that can vary depending upon the desired properties sought to be obtained by the present application. Generally the term "about", as used herein when referring to a measurable value such as an amount of weight, time, dose, etc. is meant to encompass in one example variations of ±20%, in another example ±10%, in another example ±5%, in another example ±1%, and in yet another example ±0.1% from the specified amount, as such variations are appropriate to perform the disclosed method.

All examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features and steps are not limited to serial execution, but rather may be executed asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations that are disclosed and may not explicitly recited. As such, it should be understood that advantages, embodiments, examples, functional, features, logical, operational, organizational, structural, topological, and/or other aspects of the disclosure are not to be considered limitations on the disclosure as defined by the embodiments, examples, claims or limitations on equivalents to the embodiments, examples, and/or claims. It is to be understood that, depending on the particular needs and/or characteristics of an electrochemical cell, such as a coin cell battery or the like, various embodiments or portions of various embodiments of the coin cell batteries described herein may be implemented that allow a great deal of flexibility and customization.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A package for an electrochemical cell having a water-soluble coating on at least one terminal, wherein the package comprises:

a first plastic panel having a first planar portion;

a second plastic panel having a second planar portion, wherein the second plastic panel is secured to the first plastic panel such that the first planar portion is in a first plane parallel and adjacent to the second planar portion in a second plane;

wherein at least one of the first plastic panel or the second plastic panel defines a cavity having an open side that is surrounded by the first planar portion or the second planar portion and is closed between the first plastic panel and the second plastic panel;

wherein the cavity defines:

a closed planar side opposite the open side and parallel with at least one of the first planar portion or the second planar portion; and an at least substantially cylindrical sidewall extending between the closed planar side and one of the first planar portion or the second planar portion surrounding the cavity;

wherein at least one of the first plastic panel or the second plastic panel defines a standoff post having a distal end extending into the cavity and spaced away from the sidewall to define an unoccupied volume surrounding the standoff post and spaced apart from the other of the first plastic panel or the second plastic panel to define a battery-placement cavity.

2. The package of claim 1, wherein the distal end of the standoff post is a circular planar surface.

3. The package of claim 2, wherein the circular planar surface has a first diameter and the cavity has a second diameter, and wherein the first diameter is between 1-65% of the second diameter.

4. The package of claim 1, wherein the standoff post has a height between 20%-50% of an interior height of the cavity, wherein the interior height of the cavity is measured perpendicular to the closed planar side.

5. The package of claim 1, wherein the first plastic panel defines a first substantially cylindrical cavity and the second plastic panel defines a second substantially cylindrical cavity aligned with the first substantially cylindrical cavity.

6. The package of claim 1, wherein the first plastic panel defines a first standoff post and the second plastic panel defines a second standoff post.

7. The package of claim 1, wherein the first plastic panel defines the cavity and the standoff post, wherein the standoff post is formed within the closed planar side of the at least substantially cylindrical cavity.

8. The package of claim 1, wherein the first plastic panel defines the cavity and the standoff post, wherein the second plastic panel defines the standoff post to extend into the at least substantially cylindrical cavity.

9. A package for a battery having a water-soluble coating on at least one terminal, wherein the package comprises:

a first plastic panel having a first planar portion;

a second plastic panel having a second planar portion, wherein the second plastic panel is secured to the first plastic panel such that the first planar portion is in a first plane parallel and adjacent to the second planar portion in a second plane;

wherein the first plastic panel defines a truncated-cone shaped cavity having an open side that is surrounded by the first planar portion and covered by the second planar portion of the second plastic panel;

wherein the truncated-cone shaped cavity defines:

a closed planar side opposite the open side and parallel with the first planar portion, wherein the closed planar side has a diameter less than a diameter of the open side; and a sidewall extending between the closed planar side and the first planar portion and defining an interior angle between the sidewall and a base of the truncated-cone shape that is coplanar with the first planar portion, wherein the interior angle is between 45°-85°.

10. The package of claim 9, wherein the interior angle is between 75°-85°.

11. The package of claim 9, wherein the closed planar side of the truncated-cone shaped cavity has a diameter less than 20 mm.

12. A packaged electrochemical cell comprising:

an electrochemical cell comprising:

a positive terminal defining a first portion of an exterior of the electrochemical cell;

a negative terminal that is electrically insulated from the positive terminal and defining a second portion of the exterior of the electrochemical cell;

an anode positioned within an interior of the electrochemical cell and in electrical connection with the negative terminal;

a cathode positioned within the interior of the electrochemical cell, wherein the cathode is electrically separated from the anode and is in electrical connection with the positive terminal; and a water soluble aversive coating covering 2% to 50% of an area of the exterior of a first terminal selected from the positive terminal or the negative terminal; and a package surrounding the electrochemical cell, wherein the package comprises:

a first plastic panel having a first planar portion;

a second plastic panel having a second planar portion, wherein the second plastic panel is secured to the first plastic panel such that the first planar portion is in a first plane parallel and adjacent to the second planar portion in a second plane;

wherein at least one of the first plastic panel or the second plastic panel defines a cavity for housing the electrochemical cell therein, wherein the cavity has:

an open side that is closed between the first plastic panel and the second plastic panel;

a closed planar side opposite the open side and parallel with at least one of the first planar portion of the second planar portion; and a sidewall extending between the open side and the closed planar side;

wherein the cavity defines contact points with uncoated portions of the electrochemical cell while maintaining an air gap at the water soluble aversive coating.

13. The packaged electrochemical cell of claim 12, wherein the water soluble aversive coating is positioned inside a circular area on the first terminal; and wherein a first contact point is on a second terminal, opposite the first terminal; and a second contact point is outside of the circular area and prevents the water soluble aversive coating from contacting the package.

14. The packaged electrochemical cell of claim 13, wherein the second contact point is a ring-shaped contact point surrounding the water soluble aversive coating.

15. The packaged electrochemical cell of claim 14, wherein the second contact point is defined by the sidewall of the cavity.

16. The packaged electrochemical cell of claim 12, wherein the water soluble aversive coating is positioned outside of a circular area on the first terminal; and wherein a first contact point is on a second terminal, opposite the first terminal; and a second contact point is inside the circular area and prevents the water soluble aversive coating from contacting the package.

17. The packaged electrochemical cell of claim 16, wherein the second contact point is a planar distal end of a standoff post extending into the cavity.

18. The packaged electrochemical cell of claim 17, wherein the planar distal end of the standoff post is circular and has a diameter smaller than a diameter of the circular area.

19. The packaged electrochemical cell of claim 12, wherein the water soluble aversive coating is positioned outside of a first circular area on the first terminal and outside of a second circular area on the second terminal; and wherein a first contact point is a distal end of a first standoff post extending into the cavity that contacts the first terminal inside the first circular area;

wherein a second contact point is a distal end of a second standoff post extending into the cavity that contacts the second terminal inside the second circular area.

20. The packaged electrochemical cell of claim 19, wherein the sidewall of the cavity defines a third contact point with the electrochemical cell, and wherein the electrochemical cell has a first diameter and the cavity has a second diameter larger than the first diameter, and the second diameter is sized such that a side of the electrochemical cell contacts the sidewall before the first standoff post or the second standoff post contacts the water soluble coating when the electrochemical cell moves within the package.

* * * * *